(12) United States Patent
Freyberg et al.

(10) Patent No.: US 7,566,361 B2
(45) Date of Patent: Jul. 28, 2009

(54) COLOURING PREPARATIONS

(75) Inventors: Dieter Freyberg, Einselthum (DE); Friedrich-Wilhelm Raulfs, Mannheim (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 207 days.

(21) Appl. No.: 10/483,414

(22) PCT Filed: Jul. 5, 2002

(86) PCT No.: PCT/EP02/07488

§ 371 (c)(1),
(2), (4) Date: Jan. 20, 2004

(87) PCT Pub. No.: WO03/011987

PCT Pub. Date: Feb. 13, 2003

(65) Prior Publication Data

US 2004/0168609 A1 Sep. 2, 2004

(30) Foreign Application Priority Data

Jul. 17, 2001 (DE) ................. 101 33 971

(51) Int. Cl.
C09D 11/02 (2006.01)
(52) U.S. Cl. ............... 106/31.27; 106/31.56
(58) Field of Classification Search ........... 106/31.27, 106/31.58, 31.56
See application file for complete search history.

(56) References Cited

U.S. PATENT DOCUMENTS

| | | | |
|---|---|---|---|
| 5,116,409 A | 5/1992 | Moffatt | |
| 5,141,556 A | 8/1992 | Matrick | |
| 5,226,957 A * | 7/1993 | Wickramanayake et al. | 106/31.26 |
| 5,364,461 A | 11/1994 | Spivey et al. | |
| 5,531,815 A | 7/1996 | Gundlach et al. | |
| 5,688,311 A * | 11/1997 | Adamic | 106/31.86 |
| 6,019,827 A * | 2/2000 | Wickramanayake et al. | 106/31.25 |
| 6,344,497 B1 * | 2/2002 | Meyrick et al. | 523/160 |
| 6,369,025 B1 * | 4/2002 | Trinh et al. | 510/515 |
| 6,602,333 B2 * | 8/2003 | Miyabayashi | 106/31.27 |
| 6,770,331 B1 * | 8/2004 | Mielke et al. | 427/496 |

FOREIGN PATENT DOCUMENTS

| | | |
|---|---|---|
| EP | 0 483 610 | 5/1992 |
| EP | 0 649 888 | 4/1995 |
| EP | 0 863 189 | 9/1998 |
| EP | 0 892 025 | 1/1999 |
| EP | 1 029 903 | 8/2000 |
| EP | 1 029 904 | 8/2000 |
| EP | 1 041 127 | 10/2000 |
| EP | 1193301 A1 * | 4/2002 |
| JP | 2002-322395 | 11/2002 |
| WO | 99/01516 | 1/1999 |
| WO | 01 44384 | 6/2001 |
| WO | 01 48101 | 7/2001 |

OTHER PUBLICATIONS

HCAPLUS abstract of US 6,369,025 pp. 9-10.*
L. Stoilov et al.: "Products of the reaction of bromo-(2-hydroxyethoxy)alkanes with collidine in an ethylene glycol medium" XP002220983.
J.S. Bradshaw et al.: "Proton-ionizable crown compounds" J. Heterocyclic Chemistry, vol. 23, pp. 1837-1843 1986.
Janssen et al., "Unconventional, Amphiphilic Polymers Based on Chiral Poly(ethylene oxide) Derivatives. I. Synthesis and characterization", Macromolecules 1997, 30, 8113-8129.
Bradshaw et al., "Proton-Ionizable Crown compounds. 8. Synthesis and Structural Studies of Macrocyclic Polyether Ligands Containing a 4-Thiopyridone Subcyclic Unit", Journal of Heterocyclic Chemistry 23, 1986, 1837-1843.

* cited by examiner

*Primary Examiner*—Jerry Lorengo
*Assistant Examiner*—Veronica Faison Gee
(74) *Attorney, Agent, or Firm*—Oblon, Spivak, McClelland, Maier & Neustadt, P.C.

(57) ABSTRACT

Colorant preparations contain the following ingredients:
a) at least one dispersed, substantially water insoluble dye,
b) water,
c) at least one dispersant

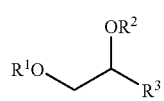

I d) a compound of the general formula I where
$R^1$, $R^2$ are independently selected from hydrogen, $(CH_2-CH_2-O)_n H$ or $(CH(CH_3)-CH_2-O)_n-H$, where n is an integer from 1 to 8; $(CH_2-CH_2-O)_a-(CH(CH_3)-CH_2-O)_b-(CH_2-CH_2-O)_c-(CH(CH_3)-CH_2-O)_d-H$, where a, b, c, d are each an integer from 0 to 7 and a+b+c+d=9.
$R^3$ is selected from straight-chain $C_2$-$C_{10}$-alkyl, $C_6$-$C_{14}$ aryl, identicallly or differently substituted by hydrogen or $C_1$-$C_8$-alkyl $CH_2-O-R^4$ where
$R^4$ is selected from $C_1$-$C_{10}$-alkyl.

38 Claims, No Drawings

COLOURING PREPARATIONS

DESCRIPTION

The present invention relates to colorant preparations comprising
a) at least one dispersed, substantially water insoluble dye,
b) water,
c) at least one dispersant and
d) a compound of the general formula I

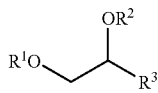

I where
$R^1$, $R^2$ are independently selected from hydrogen, $(CH_2-CH_2-O)_nH$ or $(CH(CH_3)-CH_2-O)_n-H$, where n is an integer from 1 to 8, $(CH_2-CH_2-O)_a-(CH(CH_3)-CH_2-O)_b-(CH_2-CH_2-O)_c-(CH(CH_3)-CH_2-O)_d-H$, where a, b, c, d are each an integer from 0 to 7 and $a+b+c+d \leq 9$.
$R^3$ is selected from straight-chain $C_2$-$C_{10}$-alkyl, $C_6$-$C_{14}$ aryl, identically or differently substituted by hydrogen or $C_1$-$C_8$-alkyl $CH_2-O-R^4$ where
$R^4$ is selected from $C_1$-$C_{10}$-alkyl.

The invention further relates to the use of these colorant preparations as or in inks for the ink jet process and to a process for printing sheetlike or three-dimensionally configured substrates, especially textile substrates, in the ink jet process by using the colorant preparations of the invention. The present invention lastly relates to substrates printed with the inks of the invention, for example by the transfer printing process.

Inks for use in the ink jet process (such as Thermal Ink Jet, Piezo Ink Jet, Continuous Ink Jet, Valve Jet, transfer printing processes) have to meet a whole series of requirements. They have to have a viscosity and surface tension suitable for printing, they have to be stable in storage, i.e., they should not coagulate or flocculate, and they must not lead to cloggage of the printer nozzle, which can be problematical especially in the case of inks containing dispersed, i.e., undissolved, colorant particles. Stability in storage further requires of these inks that the dispersed colorant particles do not sediment. Furthermore, in the case of Continuous Ink Jet the inks shall be stable to the addition of conducting salts and be free from any tendency to flock out with an increase in the ion content. In addition, the prints obtained have to meet colorists' requirements, i.e., show brilliance and depth of shade, and have good fastness properties, for example crockfastness, lightfastness, waterfastness and wetrubfastness, and good drying characteristics.

It is a further requirement that the inks dry rapidly on the substrate in order that images or characters to be printed may not bleed and for example the ink droplets of different colors may not mingle. The preparation of needle sharp prints requires in this connection not only print dry time minimization but also bleed control for the ink droplets on the substrate during the print dry time. An ink where the droplets do not bleed is said to have good holdout. Holdout of the prior art inks is in need of further improvement.

WO 99/01516 describes pigmented ink jet inks comprising dispersants selected from arylsulfonic acid-formaldehyde condensation products or alkoxylated phenols. The holdout of the inks thus obtainable is still capable of improvement.

U.S. Pat. No. 5,141,556 discloses aqueous inks and their use in ink jet printing which contain a dye or a dispersed pigment and also, as component c), hexene-1,2-diol or an aliphatic 1,2-diol or 1,3-diol, of which branched 1,2-diols are preferred. The holdout of the inks described is insufficient especially for needle sharp images having very fine lines.

EP 0 649 888 describes ink jet ink compositions which, as well as water and a dye, contain propylene glycol mono-n-butyl ether and/or dipropylene glycol mono-n-butyl ether and also another water soluble butyl ether. The inks thus obtainable provide good images on recycled paper; however, the holdout of the ink droplets on less absorbent materials is unsatisfactory.

U.S. Pat. No. 5,364,461 describes an addition of 1,2-pentanediol or 1,2-hexanediol to inks containing water soluble dyes to control the bleeding of ready printed images on substrates. However, these inks with water soluble dyes utilize a bleed alleviation mechanism as described in U.S. Pat. No. 5,116,409, which differs fundamentally from the bleed alleviation mechanism in the case of colorants dissolved only minimally if at all in water.

U.S. Pat. No. 5,531,815 describes additions of 1,2-alkanediols to inks containing a soluble dye and a base having a zwitterionic betaine structure. The addition of the 1,2-diol to the base having a betaine structure provides a reduced dry time for the finished ink on papery substrates. However, an addition of such a combination of diol with zwitterionic base has no effect when an ink is to be prepared using disperse dyes.

EP 0 863 189 describes the addition of 8 to 20% by weight of 1,2-pentanediol or 1,2-hexanediol or mixtures thereof to inks containing a soluble dye.

EP 0 892 025 discloses aqueous ink jet inks which contain a water soluble dye and a microemulsion comprising at least one water insoluble organic compound, a second organic compound which is miscible with the water insoluble organic compound, for example 1,2-pentanediols, and also at least one amphiphile. However, these formulations are only sensible for soluble dyes. Pigmented inks, which have technical advantages in many cases, cannot be advantageously formulated in the manner disclosed.

EP 1 029 903 shows that mixtures of branched diols such as for example 2-methyl-2,4-pentanediol or 1,2-octanediol with 3-hexyne-2,5-diol control the bleeding of black pigmented inks into areas on the paper printed with colored inks formulated on the basis of soluble dyes. However, what is needed is that the inks possess good holdout even on less absorbent substrates, for example textiles.

EP-A 1 029 904 teaches that inks possessing good storage stability are obtained on adding a polymeric latex to the formulation in conjunction with a mixture of 1,2-octanediol with 3-hexyne-2,5-diol.

EP-A 1 041 127 discloses aqueous ink jet inks which, as well as a surface treated pigment and glycerol and also a polyfunctional alcohol or an acetylene glycol, contain an alkane-1,2-diol selected from 1,2-butanediol, 1,2-pentanediol and 1,2-hexanediol as a dispersant.

Inks where the colorant is a substantially water insoluble dye, i.e., a disperse dye or a solvent dye, are notable for providing particularly brilliant colors when printed on substrates, especially on textile substrates. The colors are particularly brilliant when the transfer printing process is employed. However, prior art inks are notable for unsatisfactory holdout and for frequently inadequate start-of-print capability. The reason for this is large crystals of the colorant ingredients clogging the printer nozzles and so causing one or more nozzles to fail. In the worst case, the print will be stripey or individual colors are not printed at all.

It is an object of the present invention to provide novel colorant preparations having advantageous application properties in the ink jet process involving substantially undissolved colorants, for example disperse dyes or solvent dyes, and in particular comprising good holdout coupled with good start-of-print performance and acceptable dry time.

We have found that this object is achieved by the colorant preparations defined at the beginning.

The colorant preparations of the invention include a substantially water insoluble, dispersed dye a). These dyes are also known as disperse or solvent dyes. Important examples are azo dyes and anthraquinone dyes.

It will be appreciated that the colorant preparations of the invention may also include dye mixtures, but preferably only one dye is present. The preparations may include soluble dyes similar to the hue of the dye, especially direct, acid or reactive dyes, as shading dyes.

There now follow examples of suitable disperse dyes a), although vat dyes are recited as well.

Vat dyes:
C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1, 3, 5, 10, 12, 13, 14, 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;
C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;
C.I. Vat Black 1, 2, 7, 8, 9, 13, 14, 16, 19, 20, 22, 25, 27, 28, 29, 30, 31, 32, 34, 36, 56, 57, 58, 63, 64 and 65;

Useful dyes a), which are substantially insoluble in the water-solvent mixture, as well as the vat dyes already mentioned, include in particular azo, anthraquinone, quinophthalone, benzodifuran, methine and azamethine dyes that are free of acidic or ionic groups.

Useful dyes a) include specifically for example:
C.I. Disperse Yellow 1, 2, 3, 4, 5, 6, 7, 8, 9, 10, 11, 11:1, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 179, 180, 181, 182, 183, 184, 184:1, 198, 200, 201, 202, 203, 204, 205, 206, 207, 208, 209, 210, 211, 212, 213, 214, 215, 216, 217, 218, 219, 220, 221, 222, 223, 224, 225, 226, 227 and 228;
C.I. Disperse Orange 1, 2, 3, 3:3, 4, 5, 6, 7, 8, 9, 10, 11, 12, 13, 14, 15, 16, 17, 18, 19, 20, 21, 22, 23, 24, 25, 25:1, 26, 27, 28, 29, 30, 31, 32, 33, 34, 35, 36, 37, 38, 39, 40, 41, 41:1, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 126, 127, 128, 129, 130, 131, 136, 137, 138, 139, 140, 141, 142, 143, 145, 146, 147 and 148;
C.I. Disperse Red 1, 2, 3, 4, 5, 5:1, 6, 7, 8, 9, 10, 11, 12, 13, 14, 15, 16, 17, 18, 19, 20, 21, 22, 23, 24, 25, 26, 27, 28, 29, 30, 30:1, 31, 32, 33, 34, 35, 36, 38, 39, 40, 41, 43, 43:1, 46, 48, 50, 51, 52, 53, 54, 55, 55:1, 56, 58, 59, 60, 61, 63, 65, 66, 69, 70, 72, 73, 74, 75, 76, 77, 79, 80, 81, 82, 84, 85, 86, 86:1, 87, 88, 89, 90, 91, 92, 93, 94, 96, 97, 98, 100, 102, 103, 104, 105, 106, 107, 108, 109, 110, 111, 112, 113, 115, 116, 117, 118, 120, 121, 122, 123, 125, 126, 127, 128, 129, 130, 131, 132, 133, 134, 135, 136, 137, 138, 139, 140, 141, 142, 143, 144, 145, 146, 147, 148, 149, 150, 151, 151:1, 152, 153, 154, 155, 156, 157, 158, 159, 160, 161, 162, 163, 164, 165, 166, 167, 167:1, 168, 169, 170, 171, 172, 173, 174, 175, 176, 177, 178, 179, 180, 181, 182, 183, 184, 185, 186, 187, 188, 189, 190, 190:1, 191, 191:1, 192, 193, 194, 195, 211, 223, 224, 273, 274, 275, 276, 277, 278, 279, 280, 281, 302:1, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 338, 339, 340, 341, 342, 343, 344, 346, 347, 348, 349, 352, 356 and 367;
C.I. Disperse Violet 1, 2, 3, 4, 4:1, 5, 6, 7, 8, 9, 10, 11, 12, 13, 14, 15, 16, 17, 18, 19, 20, 21, 22, 23, 24, 25, 26, 27, 28, 29, 31, 33, 34, 35, 36, 37, 38, 39, 40, 41, 42, 43, 44, 45, 46, 47, 48, 49, 50, 51, 52, 53, 54, 55, 56, 57, 58, 59, 60, 70, 81, 86, 87, 88, 89, 91, 92, 93, 94, 96 and 97;
C.I. Disperse Blue 1, 1:1, 2, 3, 3:1, 4, 5, 6, 7, 7:1, 8, 9, 10, 11, 12, 13, 13:1, 14, 15, 16, 17, 18, 19, 20, 21, 22, 23, 23:1, 24, 25, 26, 27, 28, 29, 30, 31, 32, 33, 34, 35, 36, 38, 39, 40, 42, 43, 44, 45, 47, 48, 49, 51, 52, 53, 54, 55, 56, 58, 60, 60:1, 61, 62, 63, 64, 64:1, 65, 66, 68, 70, 72, 73, 75, 76, 77, 79, 80, 81, 81:1, 82, 83, 84, 85, 86, 87, 88, 89, 90, 91, 92, 93, 94, 95, 96, 97, 98, 99, 100, 101, 102, 103, 104, 105, 106, 107, 108, 109, 111, 112, 113, 114, 115, 116, 117, 118, 119, 121, 122, 123, 124, 125, 126, 127, 128, 130, 131, 132, 133, 134, 136, 137, 138, 139, 140, 141, 142, 143, 144, 145, 146, 147, 148, 149, 150, 151, 152, 153, 154, 155, 156, 158, 159, 160, 161, 162, 163, 164, 165, 165:2, 166, 167, 168, 169, 170, 171, 172, 173, 174, 175, 195, 281, 282, 283, 283:1, 284, 285, 286, 287, 288, 289, 290, 291, 292, 293, 294, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 349, 351 and 359;
C.I. Disperse Green 1, 2, 5, 6 and 9;
C.I. Disperse Brown 1, 2, 3, 4, 4:1, 5, 7, 8, 9, 10, 11, 18, 19, 20 and 21;
C.I. Disperse Black 1, 3, 4, 5, 6, 7, 8, 9, 10, 11, 12, 13, 14, 15, 20, 22, 24, 25, 26, 27, 28, 29, 29:1, 30, 31, 32, 33, 34 and 36;
C.I. Solvent Yellow 2, 3, 7, 12, 13, 14, 16, 18, 19, 21, 25, 25:1, 27, 28, 29, 30, 33, 34, 36, 42, 43, 44, 47, 56, 62, 72, 73, 77, 79, 81, 82, 83, 83:1, 88, 89, 90, 93, 94, 96, 98, 104, 107, 114, 116, 117, 124, 130, 131, 133, 135, 141, 143, 144, 145, 146, 157, 160:1, 161, 162, 163, 167, 169, 172, 173, 176, 179, 180, 181, 182, 183, 184, 185, 186, 187, 189, 190 and 191;
C.I. Solvent Orange 1, 2, 3, 4, 5, 7, 11, 14, 20, 23, 25, 31A, 40:1, 41, 45, 54, 56, 58, 60, 62, 63, 70, 75, 77, 80, 81, 86, 99, 102, 103, 105, 106, 107, 108, 109, 110, 111, 112 and 113;
C.I. Solvent Red 1, 2, 3, 4, 8, 16, 17, 18, 19, 23, 24, 25, 26, 27, 30, 33, 35, 41, 42, 45, 48, 49, 52, 68, 69, 72, 73, 83:1, 84:1, 89, 90, 90:1, 91, 92, 106, 109, 111, 118, 119, 122, 124, 125, 127, 130, 132, 135, 141, 143, 145, 146, 149, 150, 151, 155, 160, 161, 164, 164:1, 165, 166, 168, 169, 172, 175, 179, 180, 181, 182, 195, 196, 197, 198, 207, 208, 210, 212, 214, 215, 218, 222, 223, 225, 227, 229, 230, 233, 234, 235, 236, 238, 239, 240, 241, 242, 243, 244, 245, 247 and 248;
C.I. Solvent Violet 2, 8, 9, 11, 13, 14, 21, 21:1, 26, 31, 36, 37, 38, 45, 46, 47, 48, 49, 50, 51, 55, 56, 57, 58, 59, 60 and 61;
C.I. Solvent Blue 2, 3, 4, 5, 7, 18, 25, 26, 35, 36, 37, 38, 43, 44, 45, 48, 51, 58, 59, 59:1, 63, 64, 67, 68, 69, 70, 78, 79, 83, 94, 97, 98, 99, 100, 101, 102, 104, 105, 111, 112, 122, 124, 128, 129, 132, 136, 137, 138, 139 and 143;

C.I. Solvent Green 1, 3, 4, 5, 7, 28, 29, 32, 33, 34 and 35;

C.I. Solvent Brown 1, 3, 4, 5, 12, 20, 22, 28, 38, 41, 42, 43, 44, 52, 53, 59, 60, 61, 62 and 63;

C.I. Solvent Black 3, 5, 5:2, 7, 13, 22, 22:1, 26, 27, 28, 29, 34, 35, 43, 45, 46, 48, 49 and 50.

Useful dyes a) further include substituted benzodifuranone dyes, the basic structure of which conforms to the formula A.

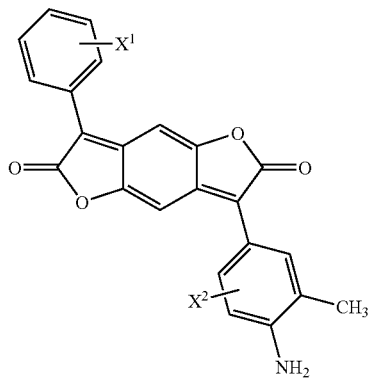

Such dyes may be substituted on either or both of the phenyl rings. Useful substituents $X^1$ and $X^2$ include halogen, alkyl with or without interruption by nonadjacent oxygen atoms, alkoxy with or without interruption by oxygen atoms and substitution in the alkyl moiety, hydroxyl, substituted or unsubstituted amino, cyano, nitro and alkoxycarbonyl.

Useful dyes further include dyes of the following formulae B to E:

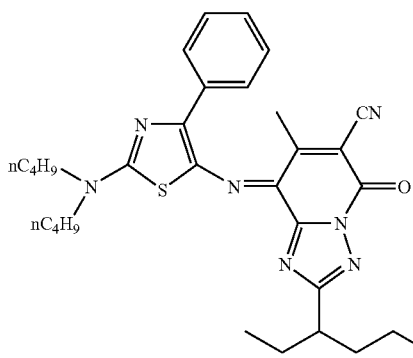

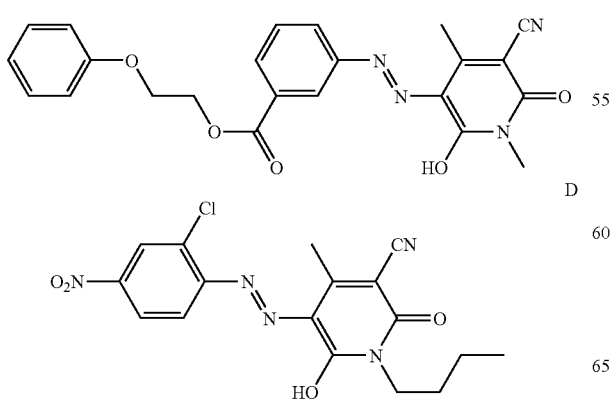

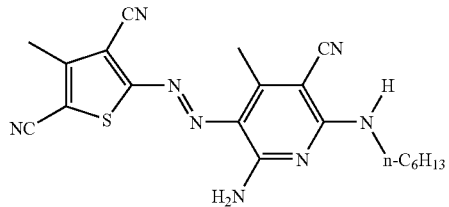

Further examples of substantially water insoluble dyes a) are recited in WO 97/46623, WO 98/24850 and WO 99/29783.

The substantially water insoluble, dispersed dyes a) should be very finely divided. It is preferred for 95% and more preferably 99% of the dye particles a) to have an average particle diameter of 1 μm and preferably 0.5 μm.

The colorant preparations of the invention generally include from 0.01 to 20% by weight, preferably from 0.2 to 10% by weight and particularly preferably from 1 to 6% by weight of dye a).

Water is the main constituent b) of the colorant preparations according to the invention, preference being given to demineralized, completely ion-free water as obtainable for example through the use of an ion exchanger. The water content is customarily in the range from 50 to 95% by weight. The preparations of the invention preferably have a water content of from 60 to 80% by weight.

The colorant preparations of the invention further generally include from 0.1 to 25% by weight and preferably from 0.5 to 10% by weight of a dispersant c).

Useful dispersants c) include in principle all dispersants known for aqueous systems.

Particularly useful dispersants c) are water soluble dispersants based on one or more water soluble alkoxylated phenols c1), one or more arylsulfonic acid-formaldehyde condensation products c2), one or more condensation products of an at least difunctional isocyanate with compounds c3) each bearing one isocyanate reactive group or one or more alkoxylated hydroxynaphthalenes c4).

Useful dispersants c1) include alkoxylated phenols of the formula C 1a

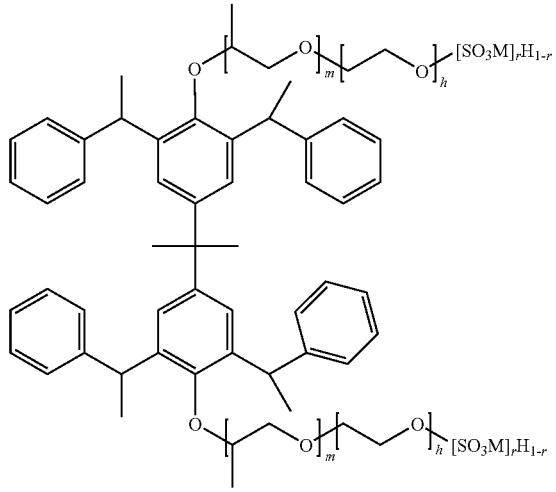

or C 1b

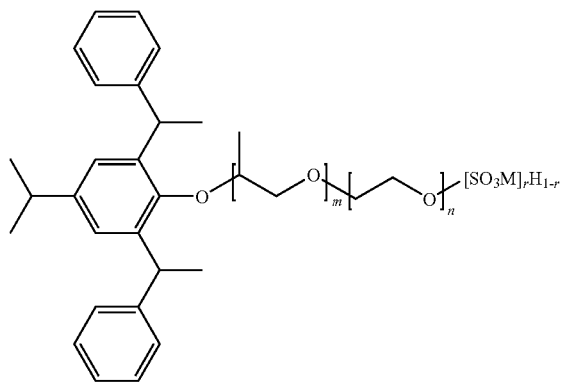

C 1b where
m is between 0 and 180, preferably between 0 and 125
h is between 15 and 200, preferably between 37 and 180, subject to the proviso that n≧m;
M is an alkali metal, preferably Na or K and particularly preferably Na;
r is 0 or 1, or mixtures thereof.

The compounds C 1a and C 1b are advantageously prepared by reacting the phenols C 1a.1 or C 1a.2

C 1a.1

C 1a.2 with propylene oxide and subsequent reaction of the adduct with ethylene oxide or by reacting C 1a.1 or C 1a.2 with ethylene oxide. The adducts may subsequently be reacted with chlorosulfonic acid or sulfur trioxide to convert them completely or partially into acid sulfuric esters and the resulting acid esters are neutralized with alkalis.

The phenols of the formulae C 1a.1 and C 1a.2 are obtainable by reacting bisphenol A (2,2-(p,p'-bishydroxydiphenyl) propane) or phenol with respectively 4 or 2 mol of styrene in the presence of an acid as a catalyst. The phenols C 1a.1 and C 1a.2 are reacted according to known processes first with propylene oxide and then with ethylene oxide or only with ethylene oxide in the presence of acidic or alkaline catalysts, for example NaOCH$_3$ or SbCl$_5$, to form the respective corresponding alkoxylation products C 1a and C 1b where r=0. The alkoxylation may be carried out for example according to the process described in U.S. Pat. No. 2,979,528.

The acid sulfuric esters are prepared by reaction of the alkoxylation products with chlorosulfonic acid or sulfur trioxide, the amount of chlorosulfonic acid or sulfur trioxide being selected so that all the free hydroxyl groups are sulfated or only a certain portion thereof. The latter case produces mixtures of compounds of the formulae C 1a and C 1b, which contain free and sulfated hydroxyl groups. For use as a dispersant, the as-synthesized acid esters of sulfuric acid are converted into water soluble salts. Advantageous water soluble salts are the alkali metal salts, for example the sodium or potassium salts. For this two equivalents of the basic compounds are required in the case of chlorosulfonic acid, one equivalent in the case of sulfur trioxide. The basic compound used is advantageously an aqueous alkali metal hydroxide. The neutralization temperature should not exceed 70° C. The salts obtained can be used in the form of aqueous solutions or else isolated as such and used in solid form.

Preference is given to dispersants c1) where m is from 1 to on average 2.5, h is on average from 37 to 250 and r is on average up to 0.5. Particular preference is given to dispersants c1) where m is from 0 to on average 2.5, h is on average from 50 to 100 and r is on average 0.5.

The dispersants c1) are known and described for example in U.S. Pat. No. 4,218,218.

The dispersants c2) are obtainable by sulfonation of aromatic compounds such as naphthalene itself or of naphthalene-comprising mixtures and subsequent condensation of the resultant arylsulfonic acids with formaldehyde.

The preferred starting material for preparing the arylsulfonic acids is the mixture of aromatic compounds which is characterized in Table 1 and which was obtained by thermal cracking of a naphthenic residue oil at from 1400 to 1700° C. and fractionation of the cracking products (fraction which passes over at 1013 mbar and 100-120° C.). These naphthenic residue oils are obtained in the cracking of light gasoline and are also referred to as high boiling aromatic hydrocarbon oils.

This aromatics fraction is a mixture of a multiplicity of aromatic substances whose structure and amount is practically impossible to determine in any detail. The following aryl compounds are the most important representatives of this aromatics fraction:

TABLE 1

| | % by weight in aromatics fraction |
|---|---|
| Naphthalene | 30-55 |
| 2-Methylnaphthalene | 5-15 |
| 1-Methylnaphthalene | 4-10 |
| Indene | 3-10 |
| Biphenyl | 1-5 |
| Methylindene | 1-5 |
| Acenaphthene | 1-4 |

The aromatics fraction further includes, in terms of identified constituents, in amounts from 0.1 to about 2% by weight the following aromatic compounds: fluorene, indan, α-methylstyrene, phenanthrene, methylindan, dimethylnaphthalene, ethylnaphthalene, xylenes, tetralin, styrene, methylethylbenzene, anthracene, fluoranthrene, pyrene and toluene.

The dispersant c2) may be prepared in the presence of aromatic or long-chain aliphatic carboxylic acids, their salts, anhydrides or mixtures.

Examples of suitable aromatic carboxylic acids and derivatives thereof are naphthalenecarboxylic acid, phthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid or acid anhydrides such as trimellitic anhydride, benzene-1,2,4,5-tetracarboxylic dianhydride or phthalic anhydride.

Suitable long-chain aliphatic carboxylic acids include in particular saturated or olefinically unsaturated, linear or branched aliphatic monocarboxylic acids having from 8 to 22, preferably from 8 to 18, carbon atoms of a natural or synthetic origin, for example higher fatty acids such as lauric acid, myristic acid, palmitic acid, stearic acid, oleic acid, linoleic acid or linolenic acid or synthetically produced carboxylic acids such as 2-ethylhexanoic acid, isononanoic acid or isotridecanoic acid.

Suitable salts of the carboxylic acids mentioned are the alkali metal, ammonium or alkaline earth metal salts, said alkali metal, ammonium or alkaline earth metal salts being obtainable, for example, by neutralization of the corresponding carboxylic acids with sodium hydroxide, potassium hydroxide, lithium hydroxide, sodium carbonate, magnesium carbonate, calcium oxide, calcium hydroxide, ammonia or alkanolamines such as ethanolamine, diethanolamine or triethanolamine.

Particular preference is given to sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid.

Dispersants c2) which are particularly suitable in this case comprise from 50 to 97% by weight, especially from 70 to 95% by weight, of arylsulfonic acid-formaldehyde condensation products and from 3 to 50% by weight, especially from 5 to 30% by weight, of aromatic or long-chain aliphatic carboxylic acids, their salts or anhydrides or mixtures thereof.

These mixtures are initially sulfonated by reaction with concentrated sulfuric acid or with oleum having an $SO_3$ content of from 10 to 65% by weight at from 120-160° C. and preferably at 135-145° C. Per part by weight of the aromatics it is advantageous to use from 0.7 to 1.5 parts by weight of oleum having an $SO_3$ content of 65% by weight or a corresponding amount of oleum having a lower $SO_3$ content. The reaction time is customarily in the range from 1.5 to 3 hours at 145° C., in the range from 2¼ to 4 hours at 140° C. and in the range from 3¼ to 6. hours at 135° C.

After sulfonation, the arylsulfonic acid mixtures contain at least 30% by weight of a mixture of α- and β-naphthalenesulfonic acids, the ratio of the α- to the β-isomers being customarily in the range from 20:1 to 1:8, especially in the range from 10:1 to 1:5 and most preferably in the range from 1:1 to 1:2.

The sulfonated products are subsequently condensed with formaldehyde. This is generally effected by diluting the reaction mixture of the sulfonation reaction with water and then adding formaldehyde, preferably in the form of an aqueous solution from 10 to 50% by weight in strength. The mixture thus formed is maintained at from 90 to 105° C. for from 4 to 12 and preferably from 7 to 9 hours. When elevated pressure is employed, for example in the range from 1.1 to 10 bar, it is also possible to use reaction temperatures in the range from 105 to 150° C. It is customary to use from 0.05 to 0.2 and preferably from 0.07 to 0.17 part by weight of formaldehyde, based on sulfonation products.

After the reaction has ended, the reaction mixture is customarily neutralized, for example with sodium hydroxide, potassium hydroxide, calcium hydroxide, sodium carbonate, potassium carbonate or sodium bicarbonate, in the form of the aqueous solutions, until the pH is in the range from 6 to 11.

The condensation products obtained from the abovementioned aromatics fraction have a sulfonic acid group content of not more than 40% by weight. The production process is such that the condensation products may additionally contain up to 10% by weight of $Na_2SO_4$ and up to 25 mol % of sulfuric acid, based on sulfonic acid groups.

The dispersants c2) and their preparation are known; cf. for example U.S. Pat. No. 5,186,846, DE-A-11 37 005 or EP-A-380 778.

The dispersants c3) are condensation products of at least difunctional isocyanates, which serve as point of attachment, with a polymeric compound (hereinafter referred to as stabilizer block) which is terminated at one end by an isocyanate-reactive group and which makes solid particles to be dispersed compatible with the dispersion medium, and an anchor group block, which can be either a homo- or copolymer of a nitrogenous monomer or an organic phosphonic ester, which each possess an isocyanate-reactive group and which each sorb onto the solid particles to be dispersed.

The isocyanate connecting the stabilizer block and the anchor group block is a diisocyanate or a more highly functional polyisocyanate having an average NCO functionality of from 2.0 to 4.5.

The diisocyanates can be aromatic or aliphatic, preference being given to aliphatic diisocyanates, such as tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate or tetramethylhexane diisocyanate, 1,4-, 1,3- or 1,2-diisocyanatocyclohexane, 4,4,'-di(isocyanatocyclohexyl)methane, 1-isocyanato-3,3,5-trimethyl-5-(isocyanatomethyl)cyclohexane (isophorone diisocyanate) or 2,4- or 2,6-diisocyanato-1-methylcyclohexane, particular preference being given to hexamethylene diisocyanate and isophorone diisocyanate.

The higher polyisocyanates may likewise be aromatic or aliphatic. Here too preference is given to aliphatic polyisocyanates, especially those having an average NCO functionality of from 1.7 to 5, especially about 3. The following groups are mentioned by way of example:

(a) Isocyanurate group containing polyisocyanates of aliphatic and/or cycloaliphatic diisocyanates. Particular preference is given here to the corresponding isocyanato-isocyanurates based on hexamethylene diisocyanate and isophorone-diisocyanate. These isocyanurates are in particular simple trisisocyanatoalkyl or trisisocyanatocycloalkyl isocyanurates, which are cyclic trimers of the diisocyanates, or mixtures with their higher homologs containing more than one isocyanurate ring. The isocyanato-isocyanurates generally have an NCO content of from 10 to 30% by weight, in particular from 15 to 25% by weight, and an average NCO functionality of from 2.6 to 4.5.

(b) Uretdione diisocyanates having aliphatically and/or cycloaliphatically attached isocyanate groups, which are preferably derived from hexamethylene diisocyanate or isophorone diisocyanate. Uretdione diisocyanates are cyclic dimerization products of diisocyanates.

(c) Biuret group containing polyisocyanates having aliphatically attached isocyanate groups, especially tris(6-isocyanatohexyl)biuret or its mixtures with its higher homologs. These biuret group containing polyisocyanates generally have an NCO content of from 18 to 25% by weight and an average NCO functionality of from 3 to 4.5.

(d) Urethane and/or allophanate group-containing polyisocyanates having aliphatically or cycloaliphatically attached isocyanate groups, as are obtainable for example by reaction of excess amounts of hexamethylene diisocyanate or of isophorone diisocyanate with simple polyhydric alcohols, such as trimethylolpropane, glycerol, 1,2-dihydroxypropane or mixtures thereof. These urethane and/or allophanate group containing polyisocyanates generally have an NCO content of from 12 to 20% by weight and an average NCO functionality of from 2.5 to 3.

(e) Oxadiazinetrione group containing polyisocyanates, preferably derived from hexamethylene diisocyanate or isophorone diisocyanate. Such oxadiazinetrione group containing polyisocyanates are preparable from diisocyanate and carbon dioxide.

(f) Uretoneimine-modified polyisocyanates.

The polymeric compound forming the stabilizer block is preferably a polymeric compound of the general formula C 3a $$R^5-Y_x-XH \qquad \text{C 3a}$$

where

R$^5$ is hydrogen,

C$_1$-C$_{28}$-alkyl, preferably C$_1$-C$_{10}$-alkyl, for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl and n-decyl; preferably C$_1$-C$_6$-alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, particularly preferably C$_1$-C$_4$-alkyl such as methyl, ethyl, n-propyl, iso-propyl, n-butyl, iso-butyl, sec-butyl and tert-butyl.

C$_2$-C$_{28}$-alkenyl having one or more double bonds, substituted or unsubstituted, for example vinyl, 1-allyl, 3-allyl, ω-butenyl, ω-pentenyl, ω-hexenyl, ω-decenyl, ω-undecenyl, ω-eicosenyl, 1-cis-buta-1,3-dienyl or 1-cis-hexa-1,5-dienyl. Examples of substituted C$_2$-C$_{28}$-alkenyl groups are isopropenyl, 1-isoprenyl, α-styryl, β-styryl, 1-cis-1,2-phenylethenyl or 1-trans-1,2-phenylethenyl.

C$_2$-C$_{28}$-alkynyl having one or more triple bonds, substituted or unsubstituted and optionally having double bonds, for example ethynyl, propargyl, ω-butynyl, but-2-ynyl, ω-pentynyl, pent-2-ynyl, pent-3-ynyl, 2-methylpent-3-ynyl, ω-hexynyl, ω-decynyl, ω-undecynyl, ω-eicosynyl, or the residue of a polymerization initiator or of a chain regulator, Y represents identical or different polymerized units of monomers selected from the group consisting of α,β-ethylenically unsaturated mono- or dicarboxylic acids; unsubstituted or hydroxyl-, C$_1$-C$_6$-alkoxy-, polyalkylenoxy- or halogen-mono- or -polysubstituted C$_1$-C$_{20}$-(cyclo)alkyl or C$_7$-C$_{20}$-aralkyl esters, amides, nitriles or anhydrides of α,β-ethylenically unsaturated mono- or dicarboxylic acids; vinyl or allyl esters of aliphatic or aromatic carboxylic acids; vinyl or allyl ethers; ethylenically unsaturated sulfonic acids or sulfonic acid derivatives, halogenated or unhalogenated ethylenically unsaturated aliphatic C$_2$-C$_{20}$ hydrocarbons; aromatic ethylenically unsaturated compounds and compounds polymerizable to form polyphosphacenes; or is

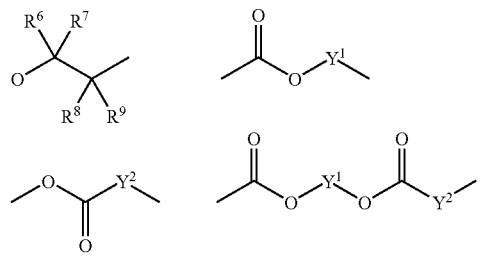

where

R$^6$ to R$^9$ are independently hydrogen,

C$_1$-C$_6$-alkyl, for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, particularly preferably C$_1$-C$_4$-alkyl such as methyl, ethyl, n-propyl, iso-propyl, n-butyl, iso-butyl, sec-butyl and tert-butyl.

C$_6$-C$_{20}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

—CH$_2$—Cl or —CH$_2$—OH, and Y$^1$, Y$^2$ are independently a C$_2$-C$_{20}$-alkylene, C$_6$-C$_{14}$-arylene such as for example p-phenylene or m-phenylene or aralkylene group, x is an integer between 0 and 10,000, preferably ≧2, especially ≧3 and particularly preferably in the range from 30 to 1000, and X is COO, O, S or NR$^{10}$, where R$^{10}$ is H or a C$_1$-C$_6$-alkyl group as defined above.

The polymeric compound C 3a is preferably constructed using C$_1$-C$_8$-alkyl (meth)acrylates. Particular preference is given to polymerizing one or more C$_1$-C$_4$-alkyl methacrylates, especially methyl methacrylate and/or butyl methacrylate. The isocyanate-reactive group XH is preferably a hydroxyl group which may be introduced into the terminal position of the polyacrylate with the aid of initiators which provide a hydroxyl free radical on decomposition and/or with the aid of chain regulators which contain a hydroxyl group.

The polymeric compound C 3a is most preferably a mono (generally C$_1$-C$_{18}$, preferably C$_1$-C$_4$)alkyl ether of a poly (especially C$_2$-C$_4$)alkylene glycol, which may be obtained for example by reacting an alkanol with an alkene oxide, such as ethylene oxide, propylene oxide and butylene oxide, or epichlorohydrin. Of particular suitability are C$_1$-C$_{18}$ (especially C$_1$-C$_4$) alkanols alkoxylated with from 5 to 10 000, preferably from 5 to 80, mol of ethylene oxide and/or propylene oxide, and polyethylene glycol monomethyl ethers are very particularly useful.

The weight average molecular weight of the stabilizer block is preferably within the range from about 250 to 100,000, especially within the range from about 500 to 7000.

An anchor group block embodiment useful for constructing the dispersant c3) is based on homo- or copolymers of one or more monomers selected from the group consisting of N-vinylamides, N-vinyllactams and vinyl- or allyl-substituted nitrogenous heterocycles. Examples of particularly useful monomers are N-vinylpyrrolidone, N-vinylpyridine, N-vinylcaprolactam, N-vinylimidazole and N-vinylformamide, of which N-vinylpyrrolidone is preferred. The homo- or copolymer preferably has a K value of from 10 to 100, especially from 10 to 30. Termination in the form of a hydroxyl group as isocyanate-reactive group may be accomplished by conducting the polymerization in water or a lower alcohol such as isopropanol or by polymerization in the presence of an appropriate chain regulator and/or initiator.

A further anchor group block embodiment useful for constructing the dispersant c3) is formed by phosphonic esters of the general formula C 3b

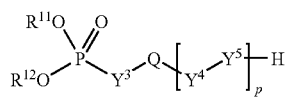

C 3b where $R^{11}$ and $R^{12}$ are independently $C_1$-$C_4$-alkyl such as methyl, ethyl, n-propyl, iso-propyl, n-butyl, iso-butyl, sec-butyl and tert-butyl, especially $R^{11}=R^{12}$=methyl or ethyl;

Q is $NR_{(2-p)}$ or $CR_{(3-p)}$ (R=H or $C_1$-$C_8$-alkyl);

$Y^3$ and $Y^4$ are independently a chemical bond or unsubstituted or $C_1$-$C_8$-alkyl- or aryl-substituted $C_1$-$C_{10}$-alkylene with or without interruption by one or more O, NR, CO, COO, OCO, CONR or NRCO;

P is 1 or 2; and $Y^5$ is COO, O, S or $NR^{13}$, where $R^{13}$ is H or a $C_1$-$C_6$-alkyl group as defined above.

Preferred examples of these phosphonic esters are diethyl N,N-bis(hydroxyethyl)aminomethylphosphonate, the dimethyl or diethyl esters of 3-hydroxymethylamino-3-oxopropylphosphonic acid, 3-aminopropylphosphonic acid, 1-aminopropylphosphonic acid, 2-aminooctylphosphonic acid, 1-aminooctylphosphonic acid, 1-aminobutylphosphonic acid, hydroxymethylphosphonic acid and 1-hydroxyethylphosphonic acid.

The reaction of the di- or polyisocyanate with the stabilizer block and the anchor group block can take place in two steps or in a one-pot reaction. Preferably, however, the reaction takes place in two steps where the di- or polyisocyanate is reacted with the stabilizer block in the first step. The reaction can take place in the absence or presence of a solvent, preference being given to the reaction in the presence of a solvent, such as acetone, THF, toluene, dioxane. When the stabilizer block has been prepared by polymerization of an ethylenically unsaturated compound, the reaction of the stabilizer block with the di- or polyisocyanate can advantageously be carried out in the same solvent as the free-radical polymerization. The reaction can be carried out without catalyst or preferably in the presence of a catalyst, such as a tertiary amine, especially triethylamine, or a metal salt, especially tin octoate or lead octoate, or an organometallic compound, such as dibutyltin dilaurate or titanium tetramethoxide. The reaction is generally carried out at a temperature from room temperature to 125° C., especially within the range from 40 to 90° C.

Further details concerning dispersants c3) are described in DE-A-198 429 52.

Dispersants c4) are alkoxylated hydroxynaphthalenes, preferably ethoxylated β-hydroxynaphthalenes. Dispersants c4) generally have an average molecular weight $M_w$ of from 2000 to 40 000 g/mol, especially from 20 000 to 35 000 g/mol, and particularly from 25 000 to 30 000 g/mol.

Dispersants c4) are generally known and available in a customary manner by alkoxylation of hydroxynaphthalene.

The colorant preparations of the invention further include compounds of the general formula I.

The variables in the formula I are defined as follows:

$R^1$ and $R^2$ are independently selected from
hydrogen, $(CH_2—CH_2—O)_n$H or $(CH(CH_3)—CH_2—O)_n$—H, where n is an integer from 1 to 8, preferably from 1 to 4;
$(CH_2—CH_2—O)_a$—$(CH(CH_3)—CH_2—O)_b$—$(CH_2—CH_2—O)_c$—$(CH(CH_3)—CH_2—O)_d$—H, where a, b, c, d are integers from 0 to 7 and $a+b+c+d \leq 9$.

$R^3$ is selected from
straight-chain $C_2$-$C_{10}$-alkyl, selected from ethyl, n-propyl, n-butyl, n-pentyl, n-hexyl, n-heptyl, n-octyl, n-nonyl, n-decyl; preferably $C_2$-$C_6$-alkyl such as ethyl, n-propyl, n-butyl, n-pentyl, n-hexyl; particularly preferably $C_2$-$C_4$-alkyl such as ethyl, n-propyl or n-butyl;

In a preferred embodiment, $R^1$ or $R^2$ or else $R^1$ and $R^2$ is selected from $(CH_2—CH_2—O)_n$—H or $(C(CH_3)—CH_2—O)_n$—H or $(CH_2—CH_2—O)_a$—$(C(CH_3)—CH_2—O)_b$—$(CH_2—CH_2—O)_c$—$(C(CH_3)—CH_2—O)_d$—H and $R^3$ is selected from straight-chain $C_2$-$C_{10}$-alkyl, $C_6$-$C_{14}$-aryl or $CH_2$—O—$R^4$. In another preferred embodiment, $R^1$ and $R^2$ are each hydrogen and $R^3$ is selected from $C_2$-$C_3$-alkyl, $C_6$-$C_{14}$-aryl or $CH_2$—O—$R^4$.

$C_6$-$C_{14}$ aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl. The $C_6$-$C_{14}$ aryl groups may also be substituted by one or more identical or different substituents selected from the group consisting of $C_1$-$C_8$-alkyl, for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl and n-octyl; preferably $C_1$-$C_6$-alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, particularly preferably $C_1$-$C_4$-alkyl such as methyl, ethyl, n-propyl, iso-propyl, n-butyl, iso-butyl, sec-butyl and tert-butyl, $CH_2$—O—$R^4$ where $R^4$ is selected from $C_1$-$C_{10}$-alkyl, for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl and n-decyl; preferably $C_1$-$C_6$-alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, particularly preferably $C_1$-$C_4$-alkyl such as methyl, ethyl, n-propyl, iso-propyl, n-butyl, iso-butyl, sec-butyl and tert-butyl.

Preferably, $R^1$ and $R^2$ are both hydrogen.

The compounds of the general formula I which are included in the colorant preparations of the invention are chiral and can be used in the form of their d- or l-enantiomers and also as mixtures. For economic reasons it is sensible to use them as racemates.

The 1,2-diols of the general formula I which are used according to the invention may be prepared for example by reacting the corresponding α-olefins with $OsO_4$ or other oxidizing agents and subsequent oxidation. A preferred way to prepare the 1,2-diols is by a 2-stage process. The first step comprises epoxidizing the corresponding α-olefins, for example with m-chloroperbenzoic acid or hydrogen peroxide. The second step comprises hydrolyzing the epoxides from the first step under acidic or basic conditions.

A further aspect of the present invention provides ethylene glycol ethers or propylene glycol ethers or mixed ethylene glycol/propylene glycol ethers of the formula I where the radicals are defined as follows:

$R^1$, $R^2$ are independently selected from $(CH_2—CH_2—O)_nH$ or $(CH(CH_3)—CH_2—O)_n—H$, where n is an integer from 1 to 8, preferably from 1 to 4;

$(CH_2—CH_2—O)_a—(CH(CH_3)—CH_2—O)_b—(CH_2—CH_2—O)_c—(CH(CH_3)—CH_2—O)_d—H$, where a, b, c, d are integers from 0 to 7 and a+b+c+d=9.

$R^3$ is selected from
straight-chain $C_2$-$C_{10}$-alkyl selected from ethyl, n-propyl, n-butyl, n-pentyl, n-hexyl, n-heptyl, n-octyl, n-nonyl, n-decyl; preferably $C_2$-$C_6$-alkyl such as ethyl, n-propyl, n-butyl, n-pentyl, n-hexyl; particularly preferably $C_2$-$C_4$-alkyl such as ethyl, n-propyl or n-butyl.

The ethylene glycol ethers or propylene glycol ethers of the general formula I according to the invention are prepared by reacting the underlying epoxidized α-olefins with ethylene glycol derivatives or with propylene glycol derivatives or with mixtures thereof under acid or basic catalysis, preferably basic catalysis. If the secondary hydroxyl group is to be selectively etherified, then the use of protecting group chemistry can lead to particularly pure products. The most preferred etherified 1,2-diols d1-d3

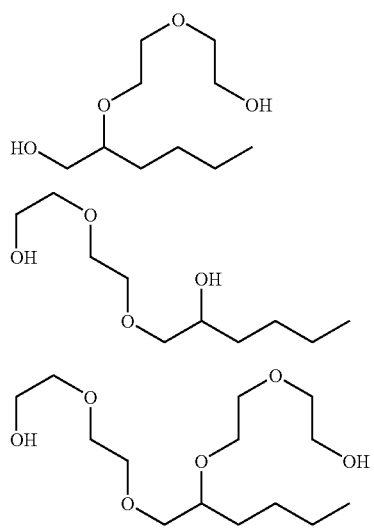

are advantageously prepared as follows:

d1: First 1,2-hexanediol (commercially available from Acros Chemicals) is benzylated with one equivalent of benzyl chloride under standard conditions. This is followed by deprotonation using a base, for example sodium methoxide $NaOCH_3$, and reaction with 2 equivalents of ethylene oxide at elevated temperature, advantageously at 100-150° C., in an autoclave. Useful solvents include methanol for example. The third step comprises a hydrogenation under standard conditions, for example over active carbon as a catalyst, to redetach the protecting group to obtain, after filtration, for example through silica gel or alumina, and solvent evaporation, the desired substance whose structure can be determined by common spectroscopic methods such as NMR spectroscopy, IR spectroscopy and mass spectrometry.

d2: Sodium is reacted with an excess of methanol to form sodium methoxide. Equimolar amounts of diethylene glycol and 1,2-epoxyhexane are then added and the mixture is heated, advantageously in an autoclave, to 100-150° C. for several hours. Excess methanol is distilled off and the residue is washed with water. Drying leaves the desired substance whose structure can be determined by common spectroscopic methods such as NMR spectroscopy, IR spectroscopy and mass spectrometry.

Alternatively, d2 may also be obtained by reacting equimolar amounts of 1,2-epoxyhexane and diethylene glycol using catalytic amounts of Lewis acid, for example boron fluoride acetate or $SbCl_5$, according to DE 27 54 576, page 9.

d3: d3 is obtainable for example by reacting d1 with 2 equivalents of ethylene oxide by deprotonating using a base, for example $NaOCH_3$, and reacting with 2 equivalents of ethylene oxide at elevated temperature in an autoclave, advantageously at 100-150° C. Useful solvents include methanol for example. Filtration, for example through silica gel or alumina, and solvent evaporation leaves the desired substance whose structure can be determined by common spectroscopic methods such as NMR spectroscopy, IR spectroscopy and mass spectrometry.

The above-described compounds according to the invention can be used similarly to 1,2-diols as an ingredient of the colorant reparations according to the invention. The addition of the compounds according to the invention provides colorant preparations having a particularly good holdout.

The colorant preparations of the invention may include one or more organic solvents as a further component. Preferred organic solvents are polyalkylene ethers such as for example polyethylene glycol, polypropylene glycol, mixed polyethers of polyethylene glycol and polypropylene glycol and also low molecular polyTHF. Low molecular weight polytetrahydrofuran can be used alone or preferably in mixture with one or more high boiling water soluble or miscible organic solvents. It is found that, surprisingly, the addition of polytetrahydrofuran further enhances the runnability of the inks according to the invention.

The polytetrahydrofuran whose use is preferred customarily has an average molecular weight $M_w$ of from 150 to 500 g/mol, preferably from 200 to 300 g/mol and particularly preferably is about 250 g/mol (corresponding to a molecular weight distribution of from 225 to 275 g/mol; Poly-THF 250, BASF Aktiengesellschaft).

Polytetrahydrofuran is preparable in a conventional manner by cationic polymerization of tetrahydrofuran.

When polytetrahydrofuran is present in a mixture with further organic solvents, the invention provides that the solvents used be high-boiling (i.e., boiling point generally >100° C.) and hence water-retaining organic solvents that are soluble in or miscible with water.

Useful solvents include polyhydric alcohols, preferably branched or unbranched polyhydric alcohols containing from 2 to 8, especially from 3 to 6, carbon atoms, such as ethylene glycol, 1,2- and 1,3-propylene glycol, glycerol, erythritol, pentaerythritol, pentitols such as arabitol, adonitol and xylitol and hexitols such as sorbitol, mannitol and dulcitol.

Useful solvents further include pyrrolidone and N-alkylpyrrolidone whose alkyl chain preferably contains 1 to 4, especially 1 to 2, carbon atoms. Examples of useful alkylpyrrolidones are N-methylpyrrolidone, N-ethylpyrrolidone and N-(2-hydroxyethyl)pyrrolidone.

Examples of particularly preferred solvents are pyrrolidone, N-methylpyrrolidone and N-(2-hydroxyethyl)pyrrolidone.

Polytetrahydrofuran may also be mixed with one or more (e.g., two, three or four) solvents.

The colorant preparations of the invention contain in general from 0.1 to 40% by weight, preferably from 5 to 30% by weight, more preferably from 10 to 25% by weight and most preferably from 10 to 20% by weight of solvent component.

The solvent component may preferably be supplemented with urea (generally from 0.5 to 3% by weight, based on the weight of the colorant preparation) to further enhance the water-retaining effect of the solvent mixture.

Colorant preparations according to the invention may include further assistants of the type which are customary especially for aqueous ink-jet inks and in the printing and coatings industry. Examples of such assistants include preservatives (such as 1,2-benzisothiazolin-3-one and its alkali metal salts, glutaraldehyde and/or tetramethylolacetylenediurea), antioxidants, degassers/defoamers (such as acetylenediols and ethoxylated acetylenediols, which customarily contain from 20 to 40 mol of ethylene oxide per mole of acetylenediol and also have a dispersing effect), viscosity regulators, flow agents, wetters (e.g., wetting surfactants based on ethoxylated or propoxylated fatty or oxo alcohols, propylene oxide/ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or preferably polyethersiloxane copolymers, especially alkoxylated 2-(3-hydroxypropyl)hepta-methyltrisiloxanes which generally have a block of 7 to 20, preferably 7 to 12, ethylene oxide units and a block of 2 to 20, preferably 2 to 10, propylene oxide units and may be present in the colorant preparations in amounts of from 0.05 to 1% by weight), anti-settlers, luster improvers, lubricants, adhesion improvers, anti-skinning agents, delusterants, emulsifiers, stabilizers, water repellents, light control additives, hand improvers, antistats and bases such as triethanolamine for regulating the pH. If such assistants are part of the colorant preparations of the invention, their total amount is generally 2% by weight, preferably 1% by weight, based on the weight of the colorant preparation.

Binder-free colorant preparations according to the invention customarily have a dynamic viscosity of from 1 to 7 mm$^2$/sec, preferably up to 5 mm$^2$/sec, especially from 1 to 3 mm$^2$/sec.

The surface tension of colorant preparations. according to the invention is generally within the range from 24 to 70 mN/m, especially from 30 to 60 mN/m.

The pH of colorant preparations according to the invention is generally from 5 to 10, preferably from 7 to 9.

Colorant preparations according to the invention are advantageously prepared as follows.

A first step comprises providing a dispersant c1)-c4). Examples of very useful dispersants are the WO 01/12728 and U.S. Pat. No. 5,186,846 naphthalenesulfonic acid-formaldehyde condensation products and the arylsulfonic-formaldehyde condensation product C2-A.

The use of compounds of the general formula I together with arylsulfonic acid-formaldehyde condensation products c2), especially with C2-A, in the preparation of colorant preparations for the ink jet process leads to particularly stable inks that exhibit a particularly good start-of-print performance. The most preferred colorant preparations according to the invention are prepared using preferably 10-200% by weight of naphthalenesulfonic acid-formaldehyde condensation products, based on dye; preferably from 50 to 150% by weight.

The substantially water insoluble colorant a), for example in the form of an aqueous presscake, is mixed together with the above-described dispersant and the dispersant c) in the presence of water and dispersed in a suitable apparatus, for example in a dissolver. The resulting mixture is then ground in a mill to the desired particle size distribution (generally 1 µm, preferably 0.5 µm). After the desired colorant concentration has been set by addition of d), water and optionally further assistants, the preparation is filtered using a filtering means with fines removal within the range from 1 to 0.5 µm, resulting in the ink jet inks of the invention.

A further aspect of the present invention is a process for printing sheetlike or three-dimensionally configured substrates via the ink jet process.

To this end, the colorant preparations of the invention or the ink jet inks of the invention are printed onto the substrate and the resultant print is subsequently fixed optionally.

In the ink-jet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23-29, and 21 (1989), No. 6, 27-32.

The colorant preparations of the invention are particularly useful as inks for the bubble jet process or the process employing a piezoelectric crystal.

The areas printed by the ink jet process are customarily treated with heat to fix and develop the dyes. The heating can be effected for example using water vapor or hot air. A customary temperature range is 160 to 180° C. for from 5 to 8 minutes. In the case of hot air it is advisable to treat the printed textile at from 180 to 200° C. for 1 minute.

In a further embodiment of the present invention, development is effected by the action of IR or microwave radiation or of high energy electromagnetic radiation.

The colorant preparations of the invention may be printed on all types of substrate materials. Examples of substrate materials include coated or uncoated cellulosics such as paper, paperboard, cardboard, wood and woodbase, coated or uncoated metallic materials such as foils, sheets or workpieces composed of aluminum, iron, copper, silver, gold, zinc or alloys thereof, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin, silicatic materials such as glass, porcelain and ceramic that are coated with polymeric materials as defined above, textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric, leather—both natural and artificial—in the form of smooth leather, nappa leather or suede leather, comestibles and cosmetics.

Preferred substrate materials are textiles, especially textiles composed of polyester or polyamides or mixtures with each other or with cotton, polyvinyl acetates and polyacrylonitrile. Polyesters are most preferred.

The substrate material may be sheetlike or three-dimensional in configuration and may be printed with the colorant preparations of the invention both uniformly and imagewise.

The colorant preparations of the invention are useful in or as ink jet inks having altogether advantageous application properties, especially good start-of-print behavior and good sustained use behavior (kogation) and also, especially when the particularly preferred combination with polytetrahydrofuran is used, excellent holdout. They are particularly useful for printing coated and uncoated paper and especially textile.

The present invention further provides ink sets for the ink jet process made up of a plurality, specifically at least two and especially at least three differently colored inks and comprising at least one ink based on the colorant preparations according to the invention. The ink sets according to the invention preferably comprise at least two differently colored inks based on the colorant preparations according to the invention and particularly preferably at least three differently colored inks based on the colorant preparations according to the invention. More particularly, the ink sets according to the invention comprise a cyan ink, a yellow ink and a magenta ink which are all based on the colorant preparations according to the invention. The ink sets according to the invention are particularly useful for printing substrates by the ink jet process.

A further embodiment of the present invention provides textile substrates which have been printed by one of the abovementioned processes according to the invention and. are notable for particularly crisply printed pictures or drawings.

It was lastly determined that the colorant preparations of the invention and the inks of the invention are particularly useful for ink jet printing by the transfer process. In the transfer printing process, the first step is for the image to be printed on a carrier material, for example onto paper, specifically on dedicated paper from Coldenhove (Netherlands) and Cam Tenero (Switzerland), and is transferred from there onto substrates, for example textile substrates, by means of heat. A further embodiment of the present invention accordingly provides a process for printing substrates, preferably textile substrates, by the transfer printing process using the colorant preparations or inks according to the invention and also substrates, preferably textile substrates, which have been printed by the transfer printing process using the colorant preparations or inks according to the invention. The inks or colorant preparations for transfer printing are preferably prepared on the basis of a disperse dye. The transfer printing inks are particularly preferably prepared on the basis of the following colorants:

Disperse Yellow 54,

Disperse Red 11, 60,

Disperse Blue 72, 289, 326, 332, 347, 359;

Disperse Violet 17.

EXAMPLES

Preparation of Inventive Colorant Preparations

1st Step: Preparation of Dispersant C2-A

Dispersant C2-A was prepared in the same way as "Dispersant 4" in U.S. Pat. No. 5,186,846.

A cracker fraction of the following composition (Table 1a) was used as a starting material:

TABLE 1a

|  | % by weight in aromatics fraction |
| --- | --- |
| Naphthalene | 54.60 |
| 2-Methylnaphthalene | 14.00 |
| 1-Methylnaphthalene | 8.30 |
| Indene | 8.40 |
| Biphenyl | 3.20 |
| Methylindene | 1.95 |
| Acenaphthene | 1.70 |
| Fluorene | 1.30 |
| Indan | 1.22 |
| Phenanthrene | 1.10 |
| Methylindan (mixed isomers) | 1.13 |
| Ethylnaphthalene (mixed isomers) | 0.90 |
| para- and meta-Xylene | 0.80 |
| Tetralin | 0.80 |
| Styrene | 0.60 |

128 g of the cracker fraction were mixed with 25 g of benzoic acid and heated to 90° C. in a kettle. 107 g of oleum having an $SO_3$ content of 65% by weight were then added over a period of 2 hours, during which care was taken to ensure that the temperature did not exceed 95° C. On completion of the oleum addition the batch was heated to 140° C. and stirred at 140° C. for about 3½ hours. This was followed by cooling to 80° C., and the addition of 150 ml of water, followed by 50 g of 30% by weight formalin solution. The ensuing condensation reaction was continued at 100° C. for 8 hours. ½ l of water was then added, followed by 131 g of 50% by weight aqueous sodium hydroxide solution. The mixture was stirred at 90° C. for one hour. A further 365 ml of water were then added before a pH of 8.4 was set with 20% by weight $H_2SO_4$. The C2-B product was lastly isolated by spray drying in a spray tower.

The product comprised the following characteristic parameters: α-: β-naphthalenesulfonic acid 1: 4.5, $Na_2SO_4$ content: 1.5% by weight.

2nd Step: Preparation of Mix Component

In a dissolver, 12.5 g of Tectilon Blue Base 6G (commercially available from Ciba Specialties) were mixed with 6.25 g of Pluriol E 400® (commercially available from BASF Aktiengesellschaft), C2-A dispersant, 0.3 g of biocide A and 0.4 g of biocide B with 0.5 g of triethanolamine and made up with 67.55 ml of demineralized water. This mixture was ball milled for 5 hours to a maximum particle diameter of 1 μm.

The composition of these and further, similarly prepared mix components is evident from Table 2. All input materials are reported in grams.

TABLE 2

| Input material | Turquoise | Yellow | Red | Blue 1 | Blue 2 |
| --- | --- | --- | --- | --- | --- |
| Inthratherm Blue P-305 NT[1] |  |  |  |  | 12.5 |
| Quinone Blue PM[2] |  |  |  | 12.5 |  |

TABLE 2-continued

| Input material | Turquoise | Yellow | Red | Blue 1 | Blue 2 |
|---|---|---|---|---|---|
| Palanil Red BFW-L[3] | | | 15 | | |
| Palanil ® Yellow 3GE[2] | | 15 | | | |
| Tectilon ® Blue | 12.5 | | | | |
| Pluriol E 400 | 6.25 | 15 | 7.5 | 12.5 | 12.5 |
| C2-A | 12.5 | 7.5 | 15 | 6.25 | 6.25 |
| Biocide A | 0.3 | 0.4 | 0.4 | 0.3 | 0.3 |
| Biocide B | 0.4 | 0.5 | 0.5 | 0.4 | 0.4 |
| Triethanolamine | 0.5 | 0.5 | 0.5 | 0.5 | 0.5 |
| DM water | 67.55 | 61.1 | 61.1 | 67.55 | 67.55 |

[1]commercially available from Compton & Knowles
[2]commercially available from Dystar GmbH
[3]commercially available from Advance 3rd Step: Formulation of Ink In a beaker, 17.78 g of a turquoise mix component prepared according to 2. were mixed with 9 g of glycerol, 5 g of Pluriol E 400®, 1.75 g of Pluriol E 4000®, 5 g of 1,2-hexanediol, 0.5 g of biocide D and 0.3 g of Tego Wet 260® and 60.7 ml of DM water.

The compositions of further inks are evident from Table 3 (see hereinbelow). Ink 3 is comparative.

4th Step

The ink obtained in step 3 was printed onto A3 paper using an Office HP 95 thermal head printer. The prints obtained had excellent line crispness. There was no nozzle failure after 40 sheets of paper, nor after 5 m² of printing. The prints obtained after standing at room temperature for 6 days were likewise excellent and free of stripes.

TABLE 3

Formulations of inks

| Ingredient | Ink 1 (turquoise) | Ink 2 (turquoise) | Comparative: ink 3 (turquoise) |
|---|---|---|---|
| Mix component | 17.78 turquoise | 17.78 turquoise | 17.78 turquoise |
| Pluriol E 400 | 5 | 5 | 5 |
| Pluriol E 4000 | 1.75 | 1.75 | 1.75 |
| Glycerol | 9 | 9 | 9 |
| 1,2-hexanediol | 5 | | |
| 1,2-pentanediol | | 5 | |
| Biocide D | 0.5 | 0.5 | 0.5 |
| Tego Wet 260 | 0.3 | 0.3 | |
| DM water | 62.42 Readily printable ink | 62.42 Readily printable ink | 65.97 Ink failure on 1st test page, further printing impossible |

Biocide A is a 50% by weight aqueous solution of glutaraldehyde.
Biocide B is a 4% by weight aqueous solution of tetramethylolacetylenediurea.
Biocide C is a 20% by weight solution of 1,2-benzisothiazolon-3-one in aqueous ethylene gycol.
Biocide D: is a 10% by weight solution of 1,2-benzisothiazolon-3-one in aqueous propylene glycol.

We claim:

1. Colorant preparations comprising
   a) at least one dispersed, substantially water insoluble dye,
   b) water,
   c) at least one dispersant,
   d) a compound of formula I

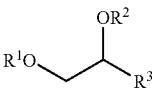

I wherein $R^1$ and $R^2$ are independently selected from the group consisting of $(CH_2-CH_2-O)_nH$ and $(CH(CH_3)-CH_2-O)_n-H$, wherein n is an integer from 1 to 4,
wherein $R^3$ is selected from the group consisting of $C_2$-$C_6$-alkyl, $C_6$-$C_{14}$ aryl, identically or differently substituted by hydrogen or $C_1$-$C_8$-alkyl, and $CH_2-O-R^4$, and
wherein $R^4$ is $C_1$-$C_{10}$-alkyl.

2. A colorant preparation as claimed in claim 1, wherein $R^3$ is a branched or unbranched $C_2$-$C_6$-alkyl.

3. A colorant preparation as claimed in claim 1, wherein $R^3$ is an unbranched $C_2$-$C_4$-alkyl.

4. A colorant preparation, comprising:
   a) at least one dispersed, substantially water insoluble dye,
   b) water,
   c) at least one dispersant, and
   d) a compound of formula I

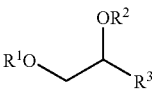

I where
$R^1$, $R^2$ are independently selected from the group consisting of hydrogen, $(CH_2-CH_2-O)_nH$ or $(CH(CH_3)-CH_2-O)_n-H$, where n is an integer from 1 to 8, and $(CH_2-CH_2-O)_a-(CH(CH_3)-CH_2-O)_b-(CH_2-CH_2-O)_c-(CH(CH_3)-CH_2-O)_d-H$, where a, b, c, d are each an integer from 0 to 7 and $a+b+c+d \leq 9$,
$R^3$ is selected from the group consisting of $C_2$-$C_6$-alkyl, $C_6$-$C_{14}$ aryl, identically or differently substituted by hydrogen or $C_1$-$C_8$-alkyl, and $CH_2-O-R^4$, where $R^4$ is $C_1$-$C_{10}$-alkyl, and
wherein dispersant c) comprises arylsulfonic acid-formaldehyde condensation products.

5. Colorant preparations as claimed in claim 1, wherein component a) is a disperse dye.

6. Colorant preparations as claimed in claim 1, wherein component a) is a solvent dye.

7. Colorant preparations as claimed in claim 1, wherein component a) is a vat dye.

8. A process for preparing ink jet inks, which comprises utilizing colorant preparations as claimed in claim 1.

9. An ink set for an ink jet process, comprising:
a plurality of differently colored inks, wherein at least one ink is based on the colorant preparations as claimed in claim 1.

10. The process for printing sheetlike or three-dimensionally configured substrates, comprising:
carrying out an ink jet process utilizing the colorant preparations as claimed in claim 1 and subsequent optional fixation.

11. The process of claim 10, wherein development is effected utilizing IR or microwave radiation.

12. The process for printing substrates by the transfer printing process utilizing colorant preparations as claimed in claim 1.

13. Substrates printed by a process as claimed in claim 10.

14. An inkjet process for printing sheet-like or 3-dimensionally configured substrates comprising:
carrying out the ink jet process utilizing ink jet inks made with the process as claimed in claim 8 and subsequent optional fixation.

15. A process for printing substrates, comprising:
carrying out a transfer printing process utilizing the inks as claimed in claim 8.

16. A colorant preparation, comprising:
a) at least one dispersed, substantially water insoluble dye,
b) water,
c) at least one dispersant, and
d) a compound of formula I

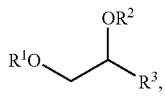

wherein $R^1$ and $R^2$ are selected from the group consisting of hydrogen, $(CH_2—CH_2—O)_n H$, $(CH(CH_3)—CH_2—O)_n—H$, where n is an integer from 1 to 8, and $(CH_2—CH_2—O)_a—(CH(CH_3)—CH_2—O)_b—(CH_2—CH_2—O)_c—(CH(CH_3)—CH_2—O)_d—H$, where a, b, c, d are each an integer from 0 to 7 and $a+b+c+d \leq 9$,
wherein $R^3$ is selected from the group consisting of $C_2$-$C_6$-alkyl, $C_6$-$C_{14}$ aryl, identically or differently substituted by hydrogen or $C_1$-$C_8$-alkyl, and $CH_2—O—R^4$,
wherein $R^4$ is $C_1$-$C_{10}$-alkyl, and
wherein at least one of $R^1$ and $R^2$ is $(CH_2—CH_2—O)_a—(CH(CH_3)—CH_2—O)_b—(CH_2—CH_2—O)_c—(CH(CH_3)—CH_2—O)_d—H$, where a, b, c, d are each an integer from 0 to 7 and $a+b+c+d \leq 9$.

17. A colorant preparation, comprising:
a) at least one dispersed, substantially water insoluble dye,
b) water,
c) at least one dispersant, and
d) a compound of formula I

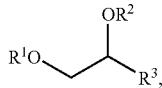

wherein $R^1$ and $R^2$ are selected from the group consisting of hydrogen, $(CH_2—CH_2—O)_n H$, $(CH(CH_3)—CH_2—O)_n—H$, where n is an integer from 1 to 8, and $(CH_2—CH_2—O)_a—(CH(CH_3)—CH_2—O)_b—(CH_2—CH_2—O)_c—(CH(CH_3)—CH_2—O)_d—H$, where a, b, c, d are each an integer from 0 to 7 and $a+b+c+d \leq 9$,
wherein $R^3$ is a $C_6$-$C_{14}$ aryl group optionally substituted with one or more of a $C_1$-$C_8$-alkyl group and a $CH_2—O—R^4$ group, and
wherein $R^4$ is $C_1$-$C_{10}$-alkyl.

18. The colorant preparation as claimed in claim 16, wherein component a) is a disperse dye.

19. The colorant preparation as claimed in claim 16, wherein component a) is a solvent dye.

20. The colorant preparation as claimed in claim 16, wherein component a) is a vat dye.

21. A process for preparing ink jet inks, which comprises utilizing colorant preparation as claimed in claim 16.

22. An ink set for an ink jet process, comprising:
a plurality of differently colored inks, wherein at least one ink is based on the colorant preparation as claimed in claim 16.

23. The process for printing sheetlike or three-dimensionally configured substrates, comprising:
carrying out an ink jet process utilizing the colorant preparation as claimed in claim 16 and subsequent optional fixation.

24. The process of claim 23, wherein development is effected utilizing IR or microwave radiation.

25. The colorant preparation as claimed in claim 17, wherein component a) is a disperse dye.

26. The colorant preparation as claimed in claim 17, wherein component a) is a solvent dye.

27. The colorant preparation as claimed in claim 17, wherein component a) is a vat dye.

28. A process for preparing ink jet inks, which comprises utilizing colorant preparations as claimed in claim 17.

29. An ink set for an ink jet process, comprising:
a plurality of differently colored inks, wherein at least one ink is based on the colorant preparation as claimed in claim 17.

30. The process for printing sheetlike or three-dimensionally configured substrates, comprising:
carrying out an ink jet process utilizing the colorant preparation as claimed in claim 17 and subsequent optional fixation.

31. The process of claim 30, wherein development is effected utilizing IR or microwave radiation.

32. The colorant preparation as claimed in claim 4, wherein component a) is a disperse dye.

33. The colorant preparation as claimed in claim 4, wherein component a) is a solvent dye.

34. The colorant preparation as claimed in claim 4, wherein component a) is a vat dye.

35. A process for preparing ink jet inks, which comprises utilizing colorant preparation as claimed in claim 4.

36. An ink set for an ink jet process, comprising:
a plurality of differently colored inks, wherein at least one ink is based on the colorant preparation as claimed in claim 4.

37. The process for printing sheetlike or three-dimensionally configured substrates, comprising:
carrying out an ink jet process utilizing the colorant preparation as claimed in claim 4 and subsequent optional fixation.

38. The process of claim 37, wherein development is effected utilizing IR or microwave radiation.

* * * * *